United States Patent [19]

Sakai et al.

[11] Patent Number: 5,906,150
[45] Date of Patent: May 25, 1999

[54] VALVES INCORPORATED STRUCTURE IN A TENSION ADJUSTING CYLINDER BODY FOR A CRAWLER TYPE VEHICLE

[75] Inventors: Makoto Sakai; Shoji Koga, both of Tokyo, Japan

[73] Assignee: Shinn Caterpillar Mitsubishi Ltd., Tokyo, Japan

[21] Appl. No.: 08/836,608

[22] PCT Filed: Aug. 30, 1996

[86] PCT No.: PCT/JP96/02450

§ 371 Date: May 13, 1997

§ 102(e) Date: May 13, 1997

[87] PCT Pub. No.: WO97/25238

PCT Pub. Date: Jul. 17, 1997

[30] Foreign Application Priority Data

Jan. 12, 1996 [JP] Japan .................................. 8-020613

[51] Int. Cl.⁶ .......................... F15B 11/08; B62D 55/30
[52] U.S. Cl. .................. 91/432; 91/422; 92/110; 305/145; 305/146

[58] Field of Search .............................. 91/422, 432, 454; 92/169.1, 110, 130 R, 130 C; 305/146, 149, 145

[56] References Cited

U.S. PATENT DOCUMENTS 3,841,715 10/1974 Comer, Jr. et al. ...................... 305/146
3,963,047 6/1976 Moring .................................... 305/146

FOREIGN PATENT DOCUMENTS 4-59589 5/1992 Japan .

*Primary Examiner*—Sheldon J. Richter
*Attorney, Agent, or Firm*—Jacobson, Price, Holman & Stern, PLLC

[57] ABSTRACT

Valves 4,5 are disposed in such a portion which is defined in an end portion of a piston 30 of an adjusting cylinder body 1 and which does not contact a load giving body 7, thereby preventing deformation by compression caused in incorporation positions of the valves 4,5 and leakage of a filling within the cylinder body 1.

1 Claim, 5 Drawing Sheets

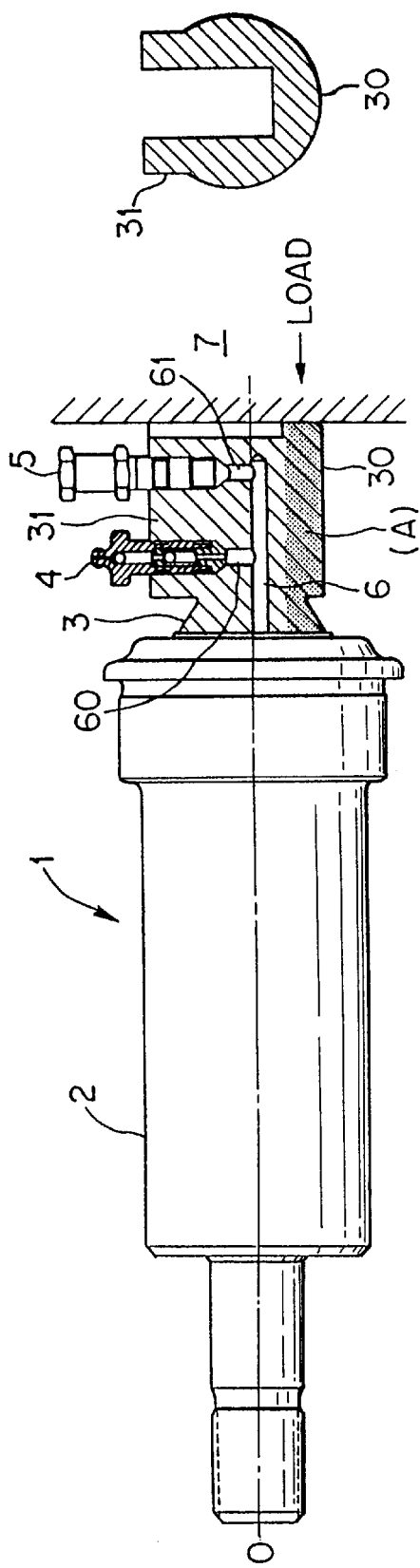
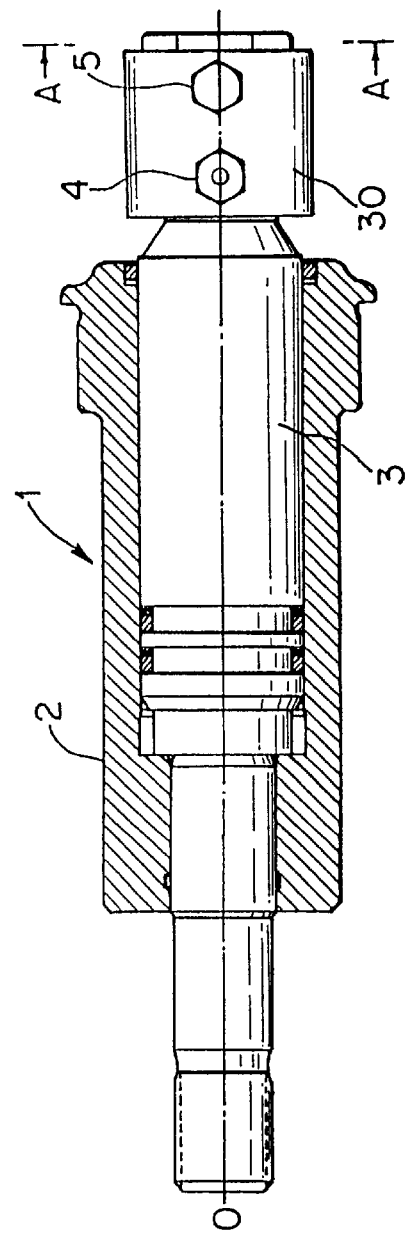

VALVES INCORPORATED STRUCTURE IN A TENSION ADJUSTING CYLINDER BODY FOR A CRAWLER TYPE VEHICLE

TECHNICAL FIELD

The invention relates a structure incorporated with valves for charging and discharging a filling with respect to a tension adjusting cylinder for performing adjustment in crawlers of crawler type vehicles.

BACKGROUND OF THE INVENTION

FIG. 3 shows a running portion of an ordinary crawler type vehicle. As shown, the running portion thereof is disposed with a driving wheel at one part of a truck frame 8 and with an idle wheel 10 at another part thereof, and is wrapped thereover with a crawler 11. For adjusting tension of the crawler 11, there is disposed an adjusting cylinder 1 via a buffer spring 12 within the truck frame 8 at the side of the idle wheel 10.

FIGS. 4 and 5 show exemplified structures having such an adjusting cylinder. The tension of the crawler is adjusted by adjusting the cylinder strokes by charing into or discharging a filling such as a grease out of the adjusting cylinder body 1. Therefore, a filling valve 4 for pouring the filling and a relief valve 5 for discharging it are disposed in the cylinder communicating with a grease passage 6, respectively (FIG. 4 shows an example where the valves 4,5 are placed in a piston portion 3, and FIG. 5 shows another example where the valves 4,5 are placed in a cylinder part 2).

Meantime, it has recently been found that the adjusting cylinder is effected with compressive load of pressure as high as from several ten to hundred tons, caused by getting foreign matters into the crawler while running (shown with (A) portions). When the cylinder receives the compressive load of such high pressure, the portion incorporated with the valves is compressively deformed, whereby a valve seat surface is deformed into an ellipse, the filling gets out of the cylinder and the adjustment about loosening of the crawler does not go ahead.

As a countermeasure thereagainst, it will be assumed that the tension adjusting cylinder is made large scaled so that the area of receiving the pressure due to the compressive load is increased, resulting in decreasing a compressive stress. However cost-up cannot be inevitably involved in company with making large scale, and the large scale is limited by sizes in running parts of the vehicle, and it is difficult to realize such a countermeasure.

Further, it may be also theoretically considered that the valves incorporated part is disposed outside of the adjusting cylinder body by such as a hose, however this is not an actual structure because an ultra high pressure is generated thereabout.

In view of the above mentioned circumstances of the prior art, the invention has been designed and is to provide an improved structure incorporated with the valves, in which the valves incorporated portion is prevented from the compressive deformation so as to avoid the leakage of the filling within the cylinder, so that the adjustment of the crawler may be well performed.

DISCLOSURE OF THE INVENTION

In the valves incorporated structrue of the tension adjusting cylinder body for the crawler type vehicle, in which a passage for allowing the filling to flow is defined in the tension adjusting cylinder body, and valves are incorporated in communication with the passage, characterized in that the valves are embedded in such an area corresponding to a range defined in the end portion of a load giving body, against which range the load giving body does not collide.

Herein, a term of the tension adjusting cylinder body shall designate a body composed of the whole of the tension adjusting cylinder comprising a cylinder part and a piston part. The term of the area corresponding to a range defined in the end portion of the load giving body against which the load giving body does not collide, shall designate such a range against which, when the position embedded with the valves is extended in the axial direction of the body, the end portion of the extended body does not collide. Further, the load giving body shall designate all the members which give the load to the main body of the tension adjusting cylinder, including of course members generating the load by themselves and members transmitting the load from other and giving it to another member.

The compressive load of high pressure is assumed to be transmitted in the axial direction of the body through the load giving body from the end portion against which the load giving body collides. Therefore, the range defined in the load giving body against which the end portion of the body directly collides is largely affected by the compressive load including a range in the axial direction. On the other hand, in the range which does not directly contact the load giving body, the affection by the compressive load is little even in the axial direction. The invention defines the valves embedded position in the range corresponding to the part defined in the end portion of the load giving body against which part the load giving body does not collide, whereby the compressive load is not directly transmitted and the affection thereby is little, so that the compressive deformation caused in the valves embedded part may be previously avoided.

In other words, depending upon the valves embedded structrue of the tension adjusting cylinder body for the crawler type vehicle by the invention, since the valves embedded part is arranged in the range of little affection by the compressive load, a chance of the compressive deformation is more reduced than the prior art. Thus, the leakage of the filling within the cylinder is in advance avoided, and the adjustment of the crawler may be satisfactorily carried out.

BRIEF DESCRIPTION OF THE DRAWINGS

FIGS. 1(a)–(c) show a first embodiment of the invention where (a) is a front view, partially in cross section, (b) is a plan view, partially in cross section, and (c) is a view taken along A—A arrow of (b);

Figure 2A:
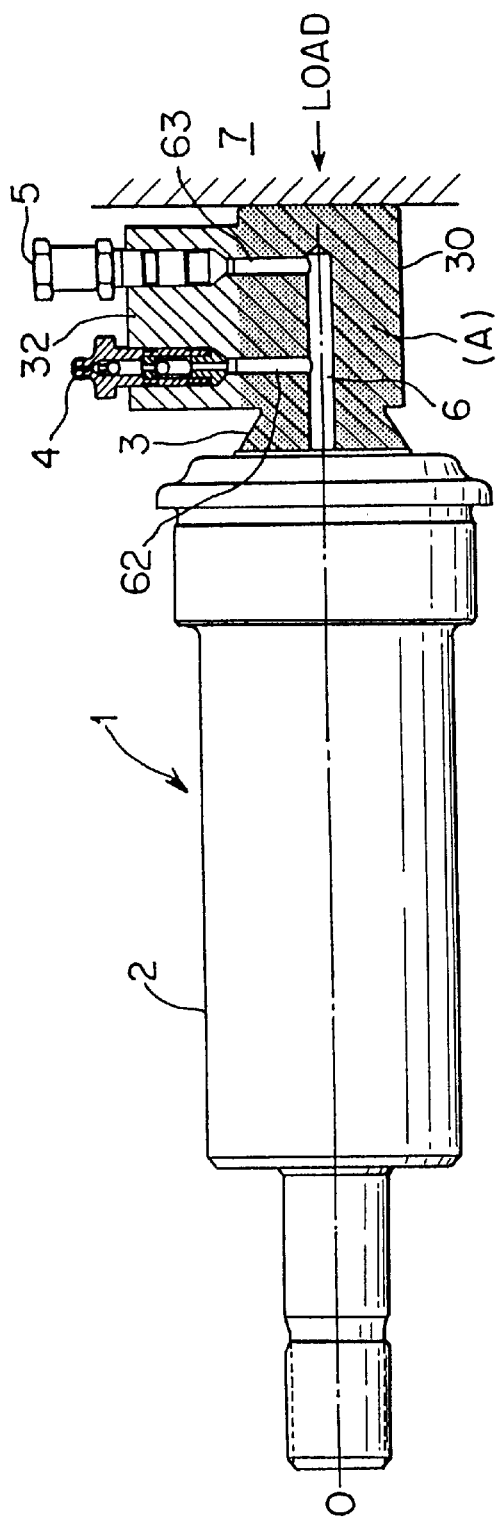
FIGS. 2(a)–(b) show a second embodiment of the invention where (a) is a front view, partially in cross section and (b) is a plan view, partially in cross section.

In the drawings, the reference numeral 1 designates the tension adjusting cylinder body, 2 is the cylinder part, 3 is a piston part, 4 is a filling valve, 5 is a relief valve, 6 is a grease passage, 7 is a vertical frame, 60 to 63 are branched passages, and (A) illustrates a load affected range.

MOST PREFERRED EMBODIMENT OF THE INVENTION

The embodiment of the invention will be explained with reference to FIGS. 1 and 2. The under mentioned embodiment is an example of the tension adjusting cylinder used in the running part of the crawler type vehicle as seen in FIG. 3. The numeral 1 is the tension adjusting cylinder body, 2 is the cylinder part, 3 is the piston part, 4 is the filling valve for charging the grease, 5 is the relief valve for discharging the grease, 6 is the grease passage for allowing the grease to flow, and 7 is the vertical frame serving as the load giving body, and each of the embodiments shows that the valves 4,5 are incorporated into the piston part 3.

FIG. 1 shows the first embodiment of the invention where (a) is a front view, partially in cross section, (b) is the plan view, partially in cross section, and (c) is the view seen along A—A arrow of (b). In the present embodiment, the grease passage is provided with at a part somewhat lower than an axial center O of the tension adjusting cylinder body 1. The front end portion 30 of the piston part 3 draws a circle in cross section around the axial center O, and continues to projections 31 facing upwardly. The grease passage 6 communicates with short branched passages 60, 61 from the upper part thereof, and the valves 4, 5 are mounted onto the branches 60, 61 from the upper portion of the grease passage 31. As shown in (a) and (c) of the same, the end portion of the piston 30 is cut at a middle portion of the upper side thereof such that the whole part of the lower side than the grease passage 6 as well as only both ends of the upper side contact the vertical panel 7. The cut out width is, in particular as shown in (c) of the same, larger than the mounted valves 4,5. Namely, the mounting position of the valves 4,5 is within a range corresponding to the cut out part not contacting the vertical frame 7.

Figure 2B:
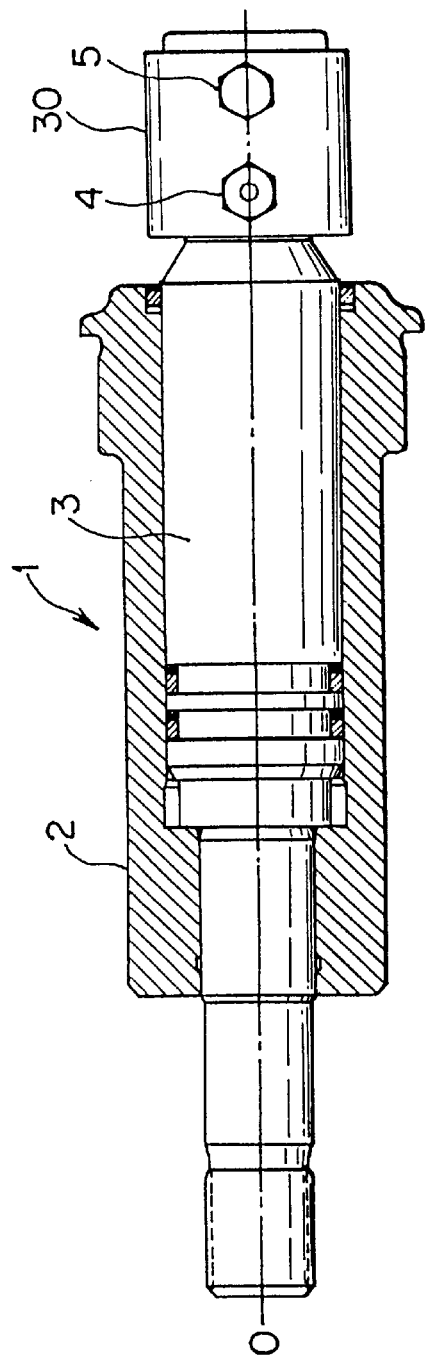
Figure 3:
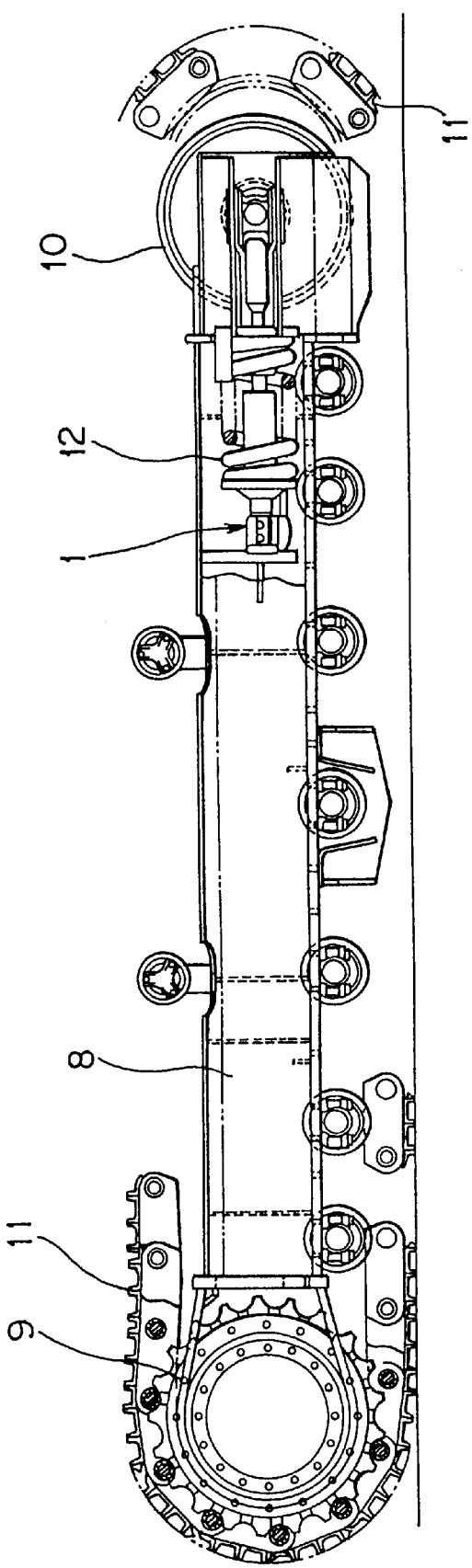
FIG. 3 schematically shows the running part of the trajectory vehicle.

FIG. 2 shows the second embodiment of the invention where (a) is the front view, partially in cross section and (b) is the plan view, partially in cross section. In the current embodiment, the grease passage 6 is defined in the piston part 3 in correspondence to the axial center O of the body 1. The end of the front portion 30 of the piston 3 is circular in cross section around the axial center O, and continues to a projection 32 somewhat retreating inwardly from said end of the front portion 30 which contacts with the vertical panel 7 serving as the load giving body. The grease passage 6 communicates, via its upper part, with longer branched passages 62,63 onto which the valves 4,5 are mounted from the upper part of the projection 32. In particular, the ends of the branches 62,63 are positioned more outside than at least the outer diameter in cross section of the end of the piston 30. That is, the incorporation portion of the valves 4,5 is arranged in the range corresponding to the part more outside than the end of the piston 30 contacting the vertical frame 7.

In each of the above mentioned embodiments, the valves 4,5 are disposed in the portion which is defined in the end portion of the piston 30 and which does not contat the vertical frame 7. On the other hand, since an area (A) affected with the compressive load is included within the range of the end portion 30 which contacts the vertical frame 7, the incorporations of the valves 4,5 outside of said area are little affected with the load. Accordingly the compressive deformation of the incorporated valves 4,5 in the present embodiments is considerably reduced than the prior art. Thus, the grease is in advance prevented from the leakage at the piston part 3, so that the crawler may be adjusted under well condition.

Figure 4A:
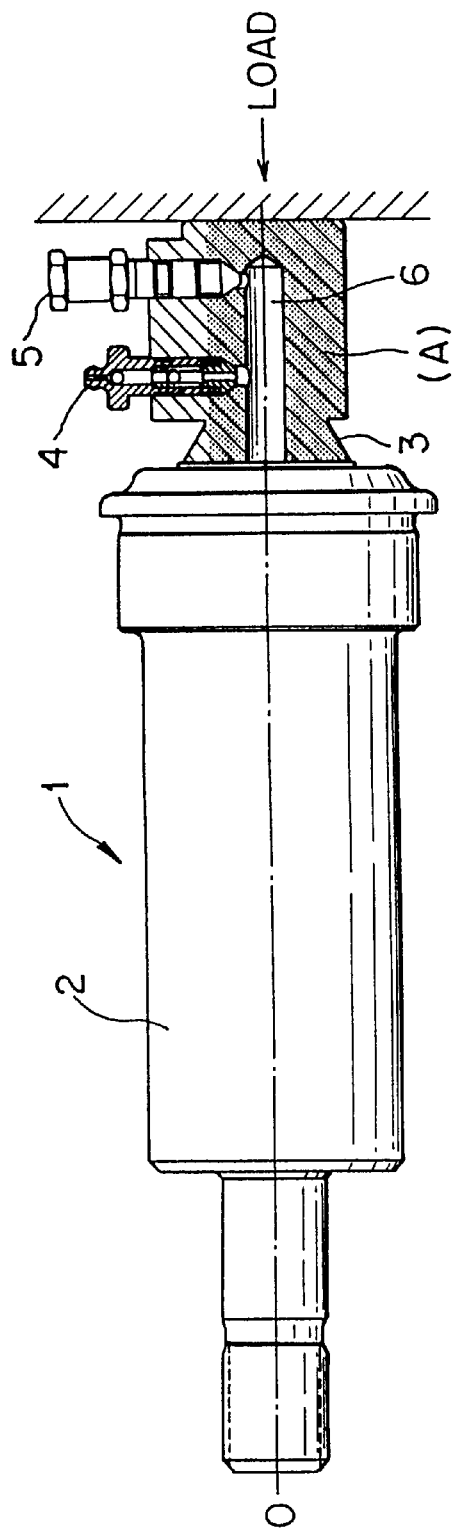
FIGS. 4(a)–(b) show an embodiment of the tension adjusting cylinder for the conventional crawler type vehicle, explaining of the valves incorporated into the piston part, and (a) is a front view, partially in cross section and (b) is a plan view, partially in cross section.
Figure 4B:
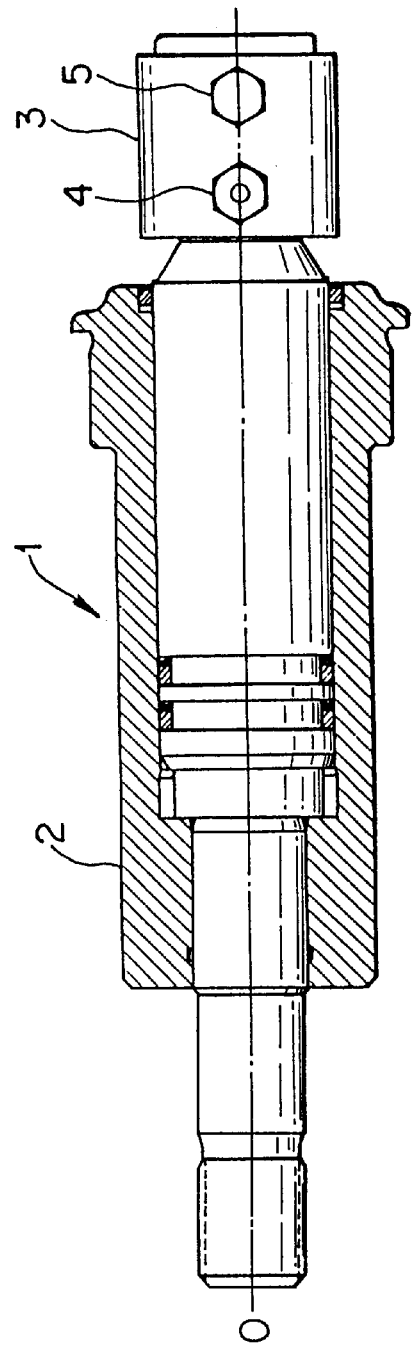
Figure 5A:
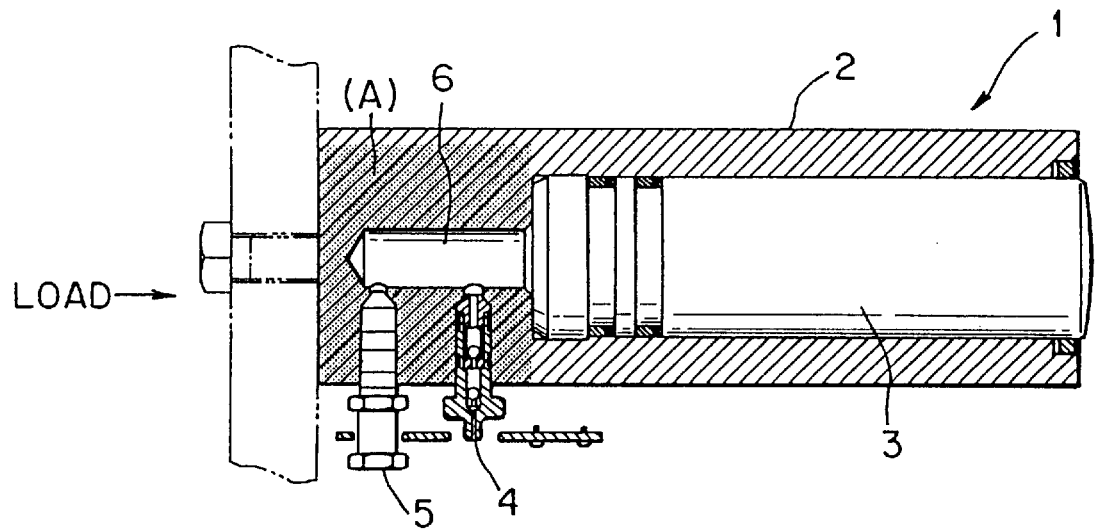
FIGS. 5(a)–(b) show another embodiment of the tension adjusting cylinder for the conventional crawler type vehicle, explaining of the valves incorporated into the cylinder part, and (a) is a front view, partially in cross section and (b) is a plan view, partially in cross section.
Figure 5B:
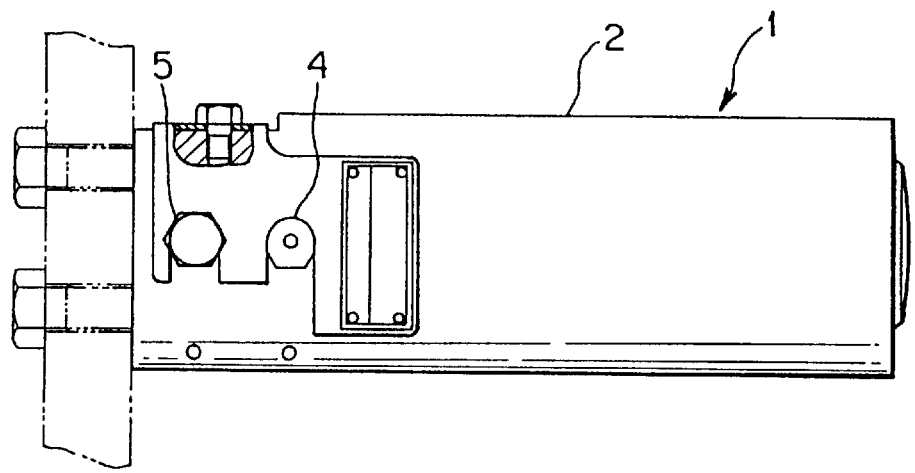

In the present embodiments, it is sufficient that only the end 30 of the piston 3 is changed in shape as seen from the comparison with the conventional structure shown in FIG. 4, and the invention may be utilized not only in a conventional cylinder 2 but also in conventional truck frame, and production is more inexpensive than merits of high general purpose utilization.

The above mentioned embodiments refer to the structural examples where the valves are incorporated into the piston portion, however the present invention may be applied to structural example where the valves are incorproated into the cylinder portion.

INDUSTRIAL APPLICABILITY

This invention is useful as a structure to be applied to the tension adjusting cylinder for performing the adjustment of the crawler of the crawler type vehicle.

We claim:

1. In valves incorporated structrue of a tension adjusting cylinder body for a crawler type vehicle, in which a passage for allowing a filling to flow is defined in the tension adjusting cylinder body, and valves are incorporated in communication with the passage, characterized in that the valves are embedded in such a scope corresponding to a range defined in the end portion of the load giving body, against which range the load giving body does not collide.

* * * * *